(12) United States Patent
Nitta

(10) Patent No.: US 6,877,224 B2
(45) Date of Patent: Apr. 12, 2005

(54) METHOD AND APPARATUS FOR MANUFACTURING A CONDENSER MANIFOLD VIA A STAMPING PROCESS UTILIZING MULTIPLE DIES

(75) Inventor: Minoru Nitta, Upland, CA (US)

(73) Assignee: Newfield Technology Corporation, Upland, CA (US)

( * ) Notice: Subject to any disclaimer, the term of this patent is extended or adjusted under 35 U.S.C. 154(b) by 15 days.

(21) Appl. No.: 10/285,804

(22) Filed: Jan. 13, 2003

(65) Prior Publication Data

US 2004/0134069 A1 Jul. 15, 2004

(51) Int. Cl.[7] .......................... B23P 15/26; B23P 17/00
(52) U.S. Cl. ........................ 29/890.07; 29/890.035; 29/890.052; 29/727
(58) Field of Search .................. 29/890.035, 890.052, 29/890.07, 726, 727; 165/176, 175; 72/39, 40

(56) References Cited

U.S. PATENT DOCUMENTS

| | | | |
|---|---|---|---|
| 3,211,118 A | * 10/1965 | Donaldson | ............. 29/890.041 |
| 4,770,240 A | 9/1988 | Dawson et al. | |
| 4,945,635 A | * 8/1990 | Nobusue et al. | ........ 29/890.043 |
| 5,090,477 A | 2/1992 | Sprow et al. | |
| 5,163,509 A | * 11/1992 | Dawson | ...................... 165/176 |
| 5,185,925 A | * 2/1993 | Ryan et al. | ............ 29/890.049 |
| 5,190,101 A | * 3/1993 | Jalilevand et al. | .......... 165/176 |
| 5,743,122 A | * 4/1998 | Rhodes et al. | .................. 72/51 |
| 5,947,196 A | * 9/1999 | Halm et al. | .................. 165/173 |
| 6,154,960 A | 12/2000 | Baldantoni et al. | |
| 6,216,777 B1 | 4/2001 | Rhodes et al. | |
| 6,260,271 B1 | * 7/2001 | Hayashi | ................. 29/890.035 |
| 6,484,398 B2 | * 11/2002 | Mori et al. | ............ 29/890.053 |

* cited by examiner

Primary Examiner—Eric Compton
(74) Attorney, Agent, or Firm—Pillsbury Winthrop LLP

(57) ABSTRACT

A system to construct a manifold from an original material. A first progressive die implements a first set of stamping stages on the original material to generate a shaped material. A second die implements at least one of a second set of stamping stages on the shaped material to generate a finished manifold. The second die is physically separate from the first die.

14 Claims, 17 Drawing Sheets

First Progressive Press 302

Top View

Side View (Width)

Sheet metal 300

Side View (Length)

Sheet metal 300

First Progressive Press 302

Potential source of scrap metal.

First tandem press
330

| | |
|---|---|
|  | Area affected by work oil. |
|  | Scraps from individual tubular body |
|  | Scraps from cup holes |

Second Tandem Press 340

METHOD AND APPARATUS FOR MANUFACTURING A CONDENSER MANIFOLD VIA A STAMPING PROCESS UTILIZING MULTIPLE DIES

BACKGROUND OF THE INVENTION

1. Field of the Invention

The present invention relates generally to the manufacture of manifolds for automobile cooling systems, and more particularly, to a system, method, and apparatus for manufacturing a manifold for a condenser or heat exchanger.

2. Discussion of the Related Art

Automotive climate control systems are well known in the art. Automobiles typically utilize climate control systems to absorb and dissipate heat from inside a passenger cabin to the outside of the automobile. In such systems, a manifold block or a direct pipe connects the condenser manifold to both a compressor and an expansion valve. The manifold block connects the compressor to the condenser and the condenser to an evaporator, so that refrigerant can flow between them. Refrigerant at high temperature and high pressure in vapor form flows through the pipes from the compressor to the condenser, via the condenser manifold. In the condenser, the high temperature and high pressure refrigerant in vapor form is condensed to form refrigerant in high temperature high pressure liquid form. Then, the liquid is passed through an expansion valve. The valve restricts the flow of the refrigerant, lowering the pressure of the liquid and forming low pressure low temperature liquid. This liquid refrigerant is then passed through the evaporator, where heat from the passenger cabin is absorbed as the refrigerant liquid evaporates. The resulting low pressure low temperature refrigerant flows to the compressor, which pressurizes the refrigerant to form high pressure high temperature vapor, repeating the process.

There are three basic methods currently used to manufacture condenser of heat exchanger manifolds in so-called tube-and-fin condensers. The first method involves cold forging. In the cold forging method, a metal used to form the manifold is melted and is molded into a basic shaped via an extrusion process. After the basic shape of the manifold is formed, the metal is cooled to ready the part for the next operation. The basic shape of the manifold is formed through the extrusion process. During the extrusion process, excess material surrounds what is to become the individual risers of the manifold. The extra material is removed via a machining process, creating a shape out of solid metal that looks like a short, solid riser. This basic shape is then cold-forged to create the final riser shape. Once the riser shape is formed, the tip of the risers are machined out or punched out via a press to form a hole.

There are drawbacks to the first method, however. The machining process often is very time-consuming and can be expensive and cumbersome because each of the risers needs to be machined prior to the cold-forging process. Also, because the cold forging step involves the application of tremendous pressure to the metal forming the manifold, manifolds are often damaged and then have to be scrapped. The tremendous pressure required for cold-forging process also affects the life of dies used in the cold-forging process. Due to the tremendous pressure, dies are prone to cracks and breakage. The die breakage is often unpredictable, and is a routine problem in the cold-forging process.

The second method of manufacturing manifolds involves machining the entire manifold directly from a block of metal. However, it is extremely wasteful to machine a manifold from an entire block of metal because a large portion of the metal that is machined off must be scrapped, since it cannot be used to form another manifold. Also, as mentioned above, the machining process is very time-consuming and can be expensive and cumbersome.

The third method of manufacturing manifolds is stamping. In a stamping process, a large die is used and a metal used to form the manifold is gradually bent into the shape of the manifold. A basic sheet metal is often used as the source metal to form the manifold. The sheet metal is then bent in a number of stages. Stamping requires a large amount of pressure to bend the metal into the shape of the manifold. However, unlike cold forging, the pressure is applied gradually over multiple stages rather than all at once. Typical dies in the art can use 20–30 stages to form the manifold.

The typical stamping process involves using one die to form the entire manifold. The various portions of the manifold are usually formed in different stages within the die. The risers can be formed via a series of stages, then the tubular shape of the manifold tanks can be formed, and finally the baffles can be formed. However, since a single die is used, the partially completed part cannot be cleaned of scraps between the time at which the riser are formed and the time at which the tubular shape of the tanks is formed. For example, if grease, dirt, or any miscellaneous scrap gets caught inside the formed tank or risers, an operator generally cannot clean out the impurity until after the entire manifold is formed. Moreover, it is very difficult to detect whether scrap is trapped in the manifold once the part takes the shape of the finished product. Accordingly, the scrap can go undetected until it is coupled to a condenser, at which point the performance of the condenser can be diminished. Once the part is in the shape of a finished product, even if a scrap is detected within the part, there is no practical means of extracting the scrap from within the finished product, resulting in disposal of the affected part. Additionally, when the manifold is in the final shape with the baffles and end crimp closures, the degreasing process becomes very difficult. When the sheet metal is being stamped into the manifold shape, heavy work oil needs to be utilized. This oil can easily get trapped where the sheet metal is pressed together to form a particular shape. With the manifolds, where the next operation is the brazing process, having any trace of heavy work oil is detrimental to the latter operation.

Also, the use of a single die can result in large time consumption. For example, if the die is currently set to produce manifolds of a particular length, it can take several hours to reset the die to produce a different manifold length. Additionally, if a die is designed to manufacture several part models, which typically is the case, there is additional part-specific setup involved. Moreover, since so many stages are undertaken by a single die, a very large press must be utilized to stamp out the manifold. The large press results in large operating costs and initial investment costs. Accordingly, because a supplier of manifolds is often under large time-pressure to deliver completed manifolds, the supplier typically has to maintain a large stock of different-sized manifolds in case they are needed. If a manufacturer utilizing one die to manufacture several different models, opts to not maintain inventory of finished parts, it must go through time-consuming die changeover many times to manufacture several different models. Additionally, for every down time, as a result of die changeover, no production can take place. An alternative to eliminate the down time is to manufacture a duplicate die. However, large complex progressive dies are quite expensive to manufacture, and thus duplicating dies present a costly alternative. Moreover, if 2 dies are to be operated simultaneously, a significant capital investment is necessary, since at least 2 large progressive die presses are required.

BRIEF DESCRIPTION OF THE DRAWINGS

FIG. 3B illustrates sheet metal at various progressive stamping stages of a progressive press according to an embodiment of the invention;

FIGS. 3C-1 to 3C-4 illustrates a partially stamped manifold according to an embodiment of the invention;

FIGS. 3D-1 to 3D-4 illustrate a first tandem press and a partially stamped manifold having cup holes according to an embodiment of the invention;

FIG. 3E illustrates a partially stamped manifold having grease and scrap located therein, according to an embodiment of the invention;

FIGS. 3F-1 to 3F-5 illustrate a second tandem press used to form a condenser manifold according to an embodiment of the invention;

FIG. 5 illustrates a cut-away view of the stamped sheet metal after implementation of the first set of stamping stages according to an embodiment of the invention.

DETAILED DESCRIPTION

According to an embodiment of the present invention, a set of dies are utilized to produce a manifold for a condenser or heat exchanger of an automobile, for example. The dies implement a series of stamping stages to "stamp out," or progressively bend, an initial piece of metal into a finished manifold, which may then be coupled to the condenser or heat exchanger. Two or more dies may be utilized to stamp out the manifolds. The first die may known as a "progressive die" because it implements more than one stamping stage. The other dies may also be progressive dies. Alternatively, the other dies may be simple tandem press dies. Tandem press dies are each designed to handle a simple operation often involving only one step. Unlike progressive dies, tandem press dies do not involve a process of gradually bending the sheet metal through multiple die stages to form the final shape, typically. Tandem presses are often very simple in design, not requiring peripheral press equipment usually associated with progressive dies, such as uncoilers and straighteners.

In an embodiment, a piece of sheet metal may be placed in the first progressive die. The first die is typically a progressive die. The first progressive die may then implement a first series of stamping stages to form the risers and the tubular body of the manifold, for example. After the first set of stamping stages has been completed, the folded metal may be cleaned or degreased, and then placed in the second die. The second die may then implement additional stamping stages to stamp out the rest of the manifold. For example, the second die may be utilized to stamp out the tanks and the baffles, form the cup holes, and crimp the ends of the tanks. In additional embodiments, more than two dies may be utilized. The second die can be either a small progressive die or a tandem press die. To be economical, tandem presses may be utilized, since initial capital investment for a tandem press is relatively low, and the tandem press die is inexpensive to manufacture.

Figure 1:
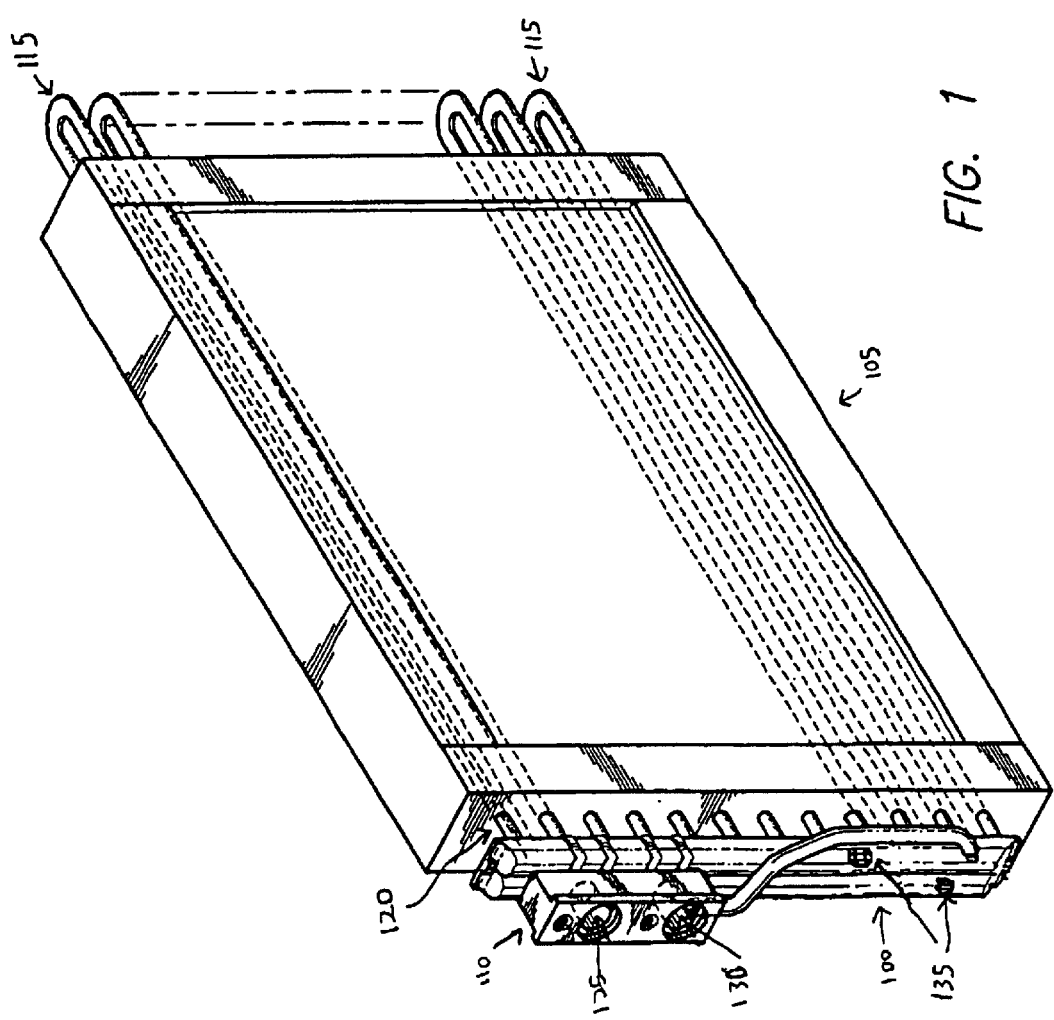
FIG. 1 illustrates a condenser manifold coupled to a condenser and a manifold block according to an embodiment of the invention.

FIG. 1 illustrates a condenser manifold 100 coupled to a condenser 105 and a manifold block 110 according to an embodiment of the invention. The condenser 105 may be utilized to dissipate heat from liquid refrigerant via a set of pipes 115. The pipes 115 may be coupled to risers 120 of the condenser manifold 100. The manifold block 110 may be utilized to couple the condenser manifold 100 to a cooling system, such as the cooling system in an automobile, for example. The manifold block 110 may include an inlet 125 to allow refrigerant to flow from other devices in the cooling system into the condenser manifold 100, and subsequently into the condenser 105. The refrigerant may enter the condenser manifold 100, and flow from the pipes 115 near the top of the condenser 105 down to the bottom of the condenser 105, radiating heat the entire way. The refrigerant may be generally prevented from flowing directly from the top of the condenser manifold 100 to the bottom by baffles 135 in the condenser manifold 100. The baffles 135 may be "crushed," or inwardly bent, portions of the condenser manifold 100 that force most of the refrigerant to flow through the pipes 115 instead of directly down the condenser manifold 100. The number of baffles 135 in the condenser manifold 100 is dependent upon the application. In general, the more baffles 135 that are used, the longer it takes refrigerant to flow from the top of the condenser 105 to the bottom. Consequently, the refrigerant is in the condenser 105 for a longer period of time and radiates off more heat. In other embodiments, the refrigerant may flow from the bottom of the condenser 105 up to the top. Other embodiments may also use a heat exchanger other than a condenser 105, for example.

Figure 2:
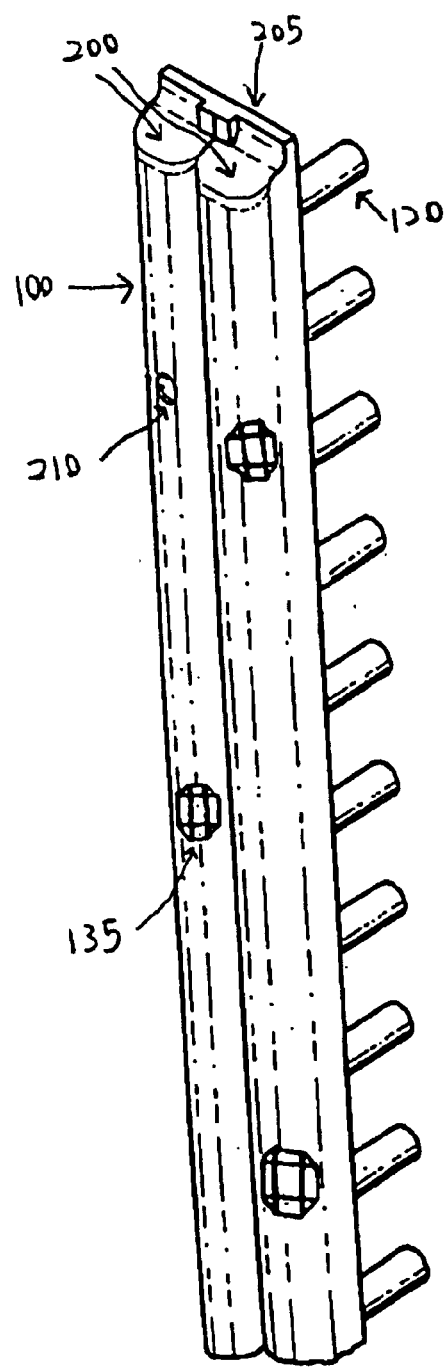
FIG. 2 illustrates a close-up view of a condenser manifold according to an embodiment of the invention.

FIG. 2 illustrates a close-up view of a condenser manifold 100 according to an embodiment of the invention. As shown, the condenser manifold 100 includes two sets of tanks 200. The tanks 200 may be cylindrically-shaped and extend the length of the condenser manifold 100. The tanks 200 serve to allow the refrigerant to flow from the risers 120 into the pipes 115 of the condenser 105. The tanks 200 may have crimped ends 205. The crimped ends 205 are closed, ensuring that the refrigerant does not leak out of one of the ends of the manifold 100. The risers 120 are short pipes that are coupled to the pipes 115 of the condenser 105. As discussed above with respect to FIG. 1, the baffles 135 serve to ensure that most of the refrigerant flows through the pipes 115, rather than directly from the top of the condenser 105 down to the bottom. The condenser manifold 100 may also include an aperture 210, through which refrigerant flows into the condenser manifold 100 from a manifold block 110 coupled to a cooling system, for example. In alternative embodiments in which a manifold block 110 is not utilized, "cup holes" or apertures in the condenser manifold 100 may serve to allow refrigerant to flow into and out of the condenser manifold 100.

Figures 1, 3A:
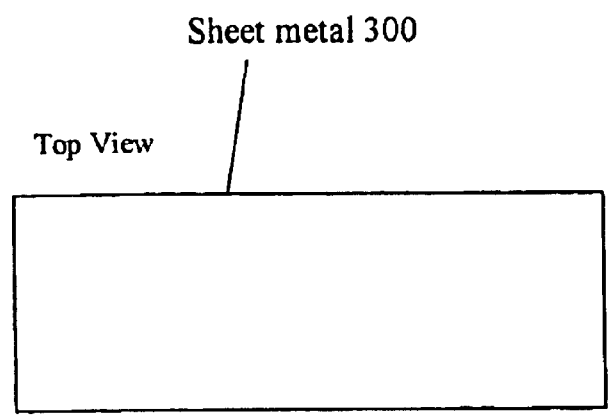
FIGS. 3A–3E illustrate sheet metal and a progressive press according to an embodiment of the invention.
Figures 2, 3A:
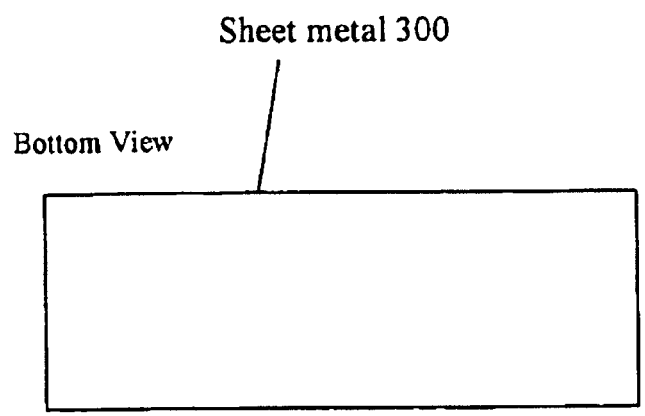
Figures 3, 3A:
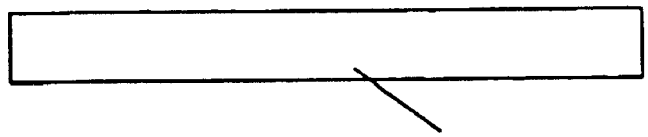
Figures 3, 3A, 4:
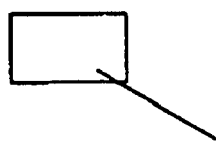

FIGS. 3A–3E illustrate sheet metal 300 and a progressive press 302 according to an embodiment of the invention. The sheet metal 300 may be utilized to form the condenser manifold 100. The sheet metal 300 may be formed of an aluminum alloy having cladding material on its top or bottom sides. FIG. 3A-1 illustrates a top view of the sheet metal 300, FIG. 3A-2 illustrates a bottom view of the sheet metal 300, FIG. 3A-3 illustrates a side view of the width of the sheet metal 300, and FIG. 3A-4 illustrates a side view of the length of the sheet metal. As illustrated, the sheet metal 300 may have a relatively uniform thickness. The top and the bottom may appear to be identical, due to the uniformity in shape (e.g., width and length) of the top and the bottom of the sheet metal 300. The side view of the long side (e.g., the "length") of the sheet metal 300 and the side view of the short side (e.g., the "width") also illustrate that the sheet metal 300 may have a uniform thickness prior to the stamping process.

FIG. 3A-5 illustrates a progressive press 302 according to an embodiment of the invention. The progressive press 302 may be utilized to implement the first stamping stages according to an embodiment of the invention. For example, the risers 120 and the tanks 200 may be formed by the progressive press 302. After they are formed, the stamped sheet metal may be removed, cleaned, and degreased, and then placed in a second progressive press or tandem press, which may then implement additional stamping stages to form the baffles 135, the cup holes, and the crimped ends 205 of the condenser manifold 100, for example.

Figures 3, 3A, 4, 5:
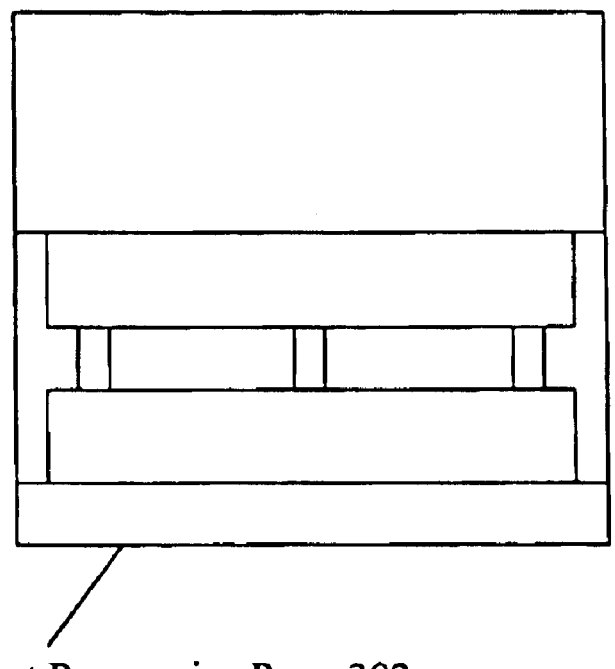
Figure 3B:
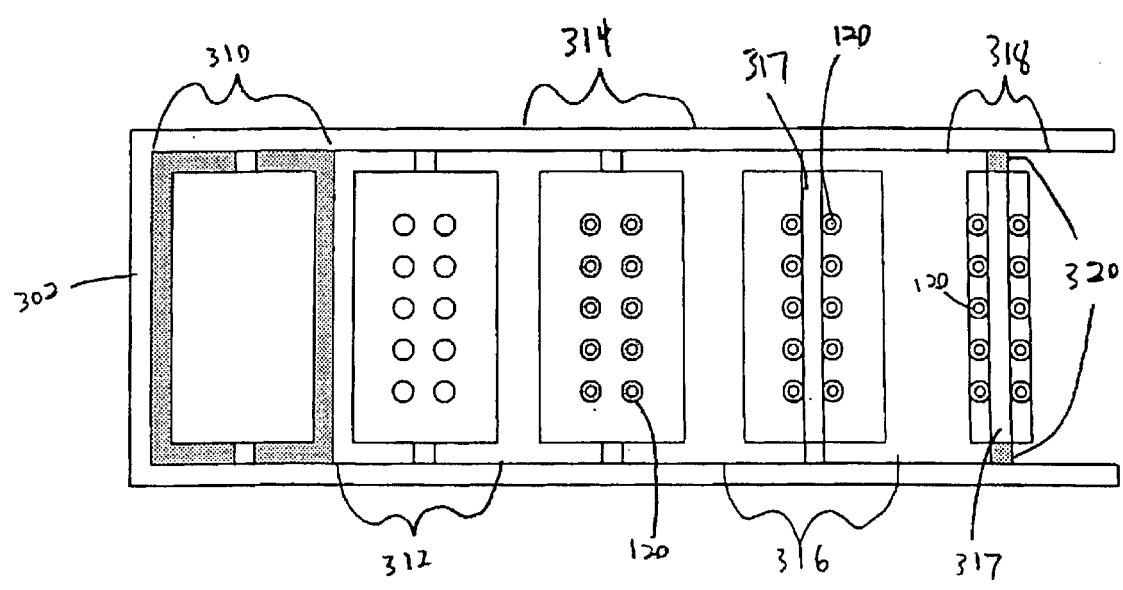
Figure 3B:

FIG. 3B illustrates the sheet metal 300 at various progressive stamping stages of the progressive press 302 according to an embodiment of the invention. The progressive press 302 may include a plurality of stages (e.g., 310, 312, 314, 316, and 318), each of which implement a stage of the pressing process. Each stage may bend, punch, or "draw" the sheet metal 300. Drawing is a type of stamping process, usually associated with movement of material, resulting in formation of a long cylindrical or any similar shape out of a flat sheet metal. For example, the risers 120 may be drawn into their shapes. The first stage 310 may be utilized to cut away the outer edge of the sheet metal 300, so that the general outline of the condenser manifold 100 may be formed. A second stage 312 may be utilized to form the shape of the risers 120 of the condenser manifold 100. The third stage 314 may be utilized to punch out the holes at the ends of the risers 120. The fourth stage 316 may be utilized to form a channel 317 of the condenser manifold. The fifth stage 318 may be utilized to bend the edges of the sheet metal 300 along the long side back away from the risers 120, so that the tanks 200 of the manifold may be formed. The channel 317 may be utilized to hold the end of the sheet metal 300 once the material is curled into the tank shape. Metal connection portions 320 connecting the stamped sheet metal to the fifth stage 318 of the progressive press 302 may then be cut away, and the stamped sheet metal may be removed from the progressive press 302. In other embodiments, the progressive press 302 may implement more or fewer than five stages.

Figures 1, 3C:
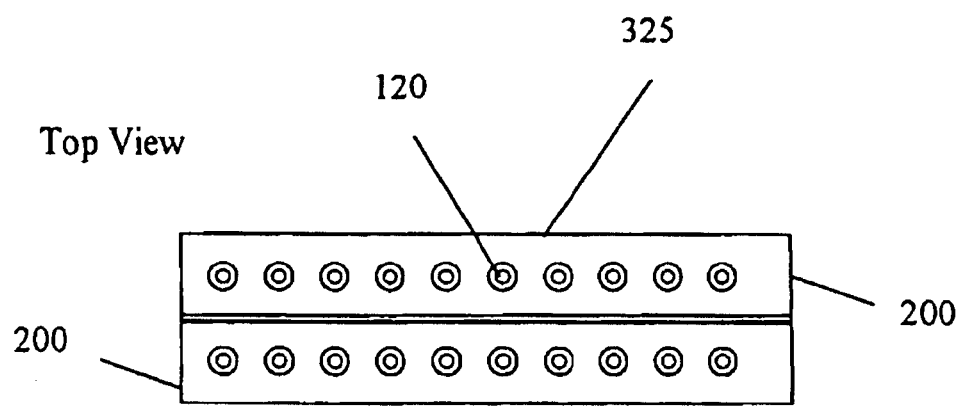
Figures 2, 3C:
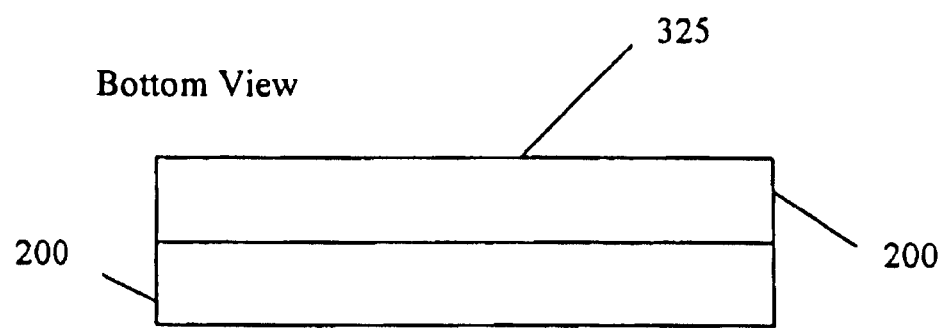
Figures 3, 3C:
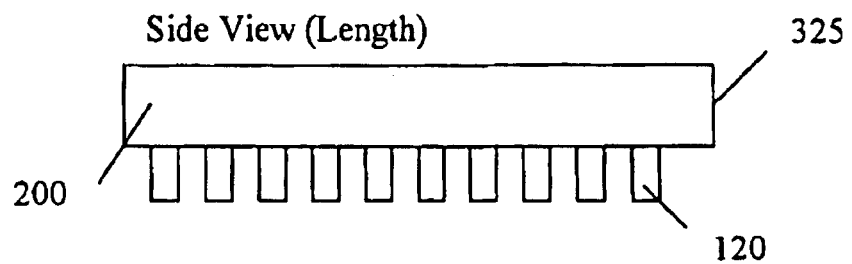
Figures 3, 3C, 4:
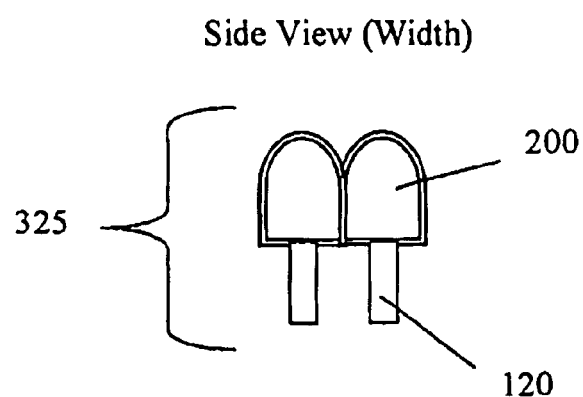

FIGS. 3C-1 to 3C-4 illustrates a partially stamped manifold 325 according to an embodiment of the invention. The partially stamped manifold 325 may be formed by the first progressive press 302. FIG. 3C-1 illustrates a top view of the partially stamped manifold 325. As shown, the risers 120 extend away from the main body of the partially stamped manifold 325.

FIG. 3C-2 illustrates a bottom view of the partially stamped manifold 325. FIG. 3C-3 illustrates a side view of the length of the partially stamped manifold 325. As shown, the risers 120 extend away from the tanks 200. FIG. 3C-4 illustrates a side view of the width of the partially stamped manifold 325. As shown, the tanks 200 extend in a direction away from the risers 120. As illustrated, the tanks 200 of the pattially stamped manifold 325 are hollow and have not been crimped on their ends.

FIGS. 3D-1 to 3D-4 illustrate a first tandem press 330 and a partially stamped manifold 325 having cup holes 332 according to an embodiment of the invention. The first tandem press 330 shown in FIG. 3D-1 may be utilized to form the cup holes 332 of the partially stamped manifold 325. Before the partially stamped manifold 332 is placed in the first tandem press 330, the partially stamped manifold 332 may be degreased and cleaned. During the formation of the cup holes 332 by the first tandem press 330, scrap metal may be created, and may be removed during a later cleaning process.

Alternatively, the cup holes 332 may be formed by the progressive die 302. Having the cup holes 332 formed by the progressive die 302 may reduce the manufacturing flexibility provided by having blank manifolds, without part specific cup holes 332. However, having cup holes 332 formed by the progressive die 302 may be beneficial for manufacturing a particular manifold model with high manufacturing volume. Even if the cup holes 332 are formed by the progressive die 302, the partially stamped manifold 332 may still be cleaned and degreased before its ends are crimped.

Figures 1, 3D:
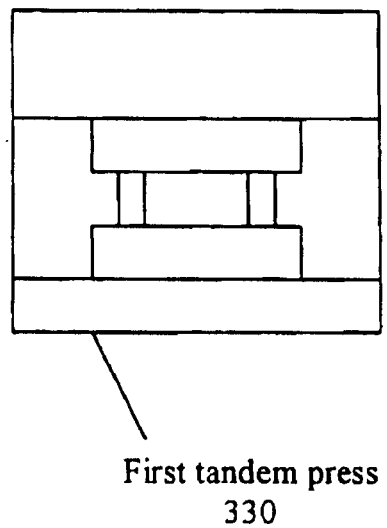
Figures 2, 3D:
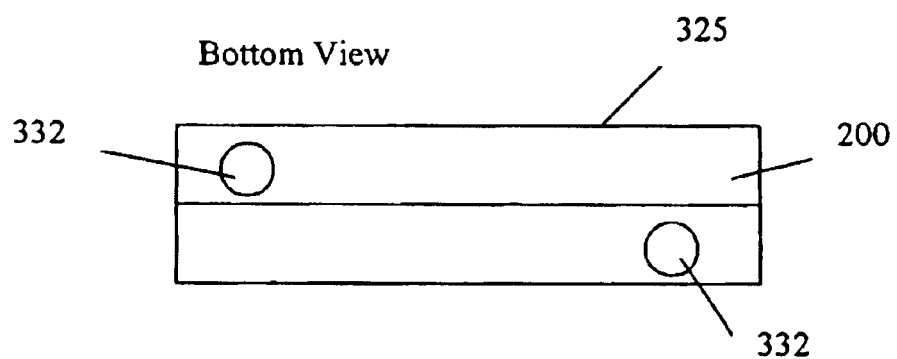
Figures 3, 3D:
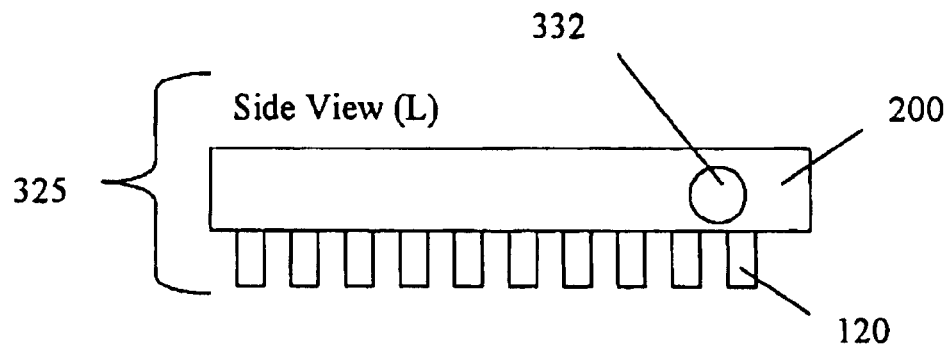
Figures 3, 3D, 4:
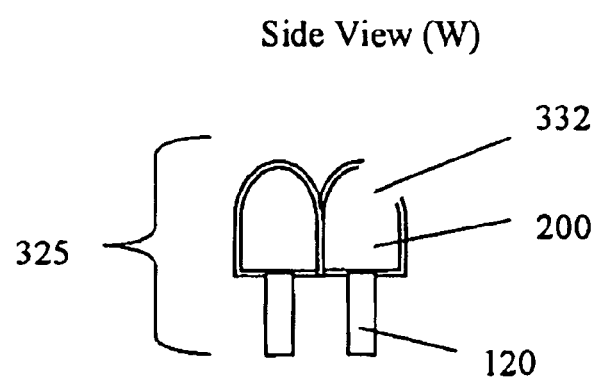

FIG. 3D-2 illustrates a bottom view of the partially stamped manifold 325 having cup holes 332 formed therein. The partially stamped manifold 325 may include two cup holes 332 to allow refrigerant to flow into and out of the condenser manifold 100. FIG. 3D-3 illustrates a side view along the length side of the partially stamped manifold 325. As illustrated, the partially stamped manifold 325 may include a cup hole 332 on its side. Accordingly, a cup hole 332 may be located near the curved edge of the long side of the partially stamped manifold 332, so that it is located on both the top and the side of the partially stamped manifold 335.

FIG. 3D-4 illustrates a side view along the width side of the partially stamped manifold 325 as shown, the cup hole 332 may be locate on the curved edge of the partially stamped manifold 325, between the top and the side.

During the formation the tubular body of the partially stamped manifold 325, scrap metal may be created. Scrap metal is created because the ends of the tubular body have to be opened via a punch process. Additional scrap may be created during the formation of the general shape, because the part is stamped out of sheet metal 300. Due to high viscosity work oil typically used in the stamping process, scrap metal (e.g., metal cut away from the sheet metal 300 during implementation of the stages in the first progressive press 302) may have a tendency to stick to the surface of the partially stamped manifold 325 due to surface tension.

Because the tanks 200 of the partially stamped manifold 325 are hollow and have not been crimped on their ends, the partially stamped manifold 325 may be cleaned. Accordingly, the cleaning process is simplified, greatly reducing the possibility of residual work oil or scrap remaining inside of the partially stamped manifold 325, which would result in a faulty condenser manifold 100. As a result of having a hollow shape from one end of the manifold to the other, it is possible to ensure that no scrap or other contaminant is trapped within the part. Having this shape allows for visual inspection or automated inspection fixture to inspect for scraps or other contaminants, and ensures that no finished part with scrap or other contaminant is shipped out to a customer.

Figure 3E:
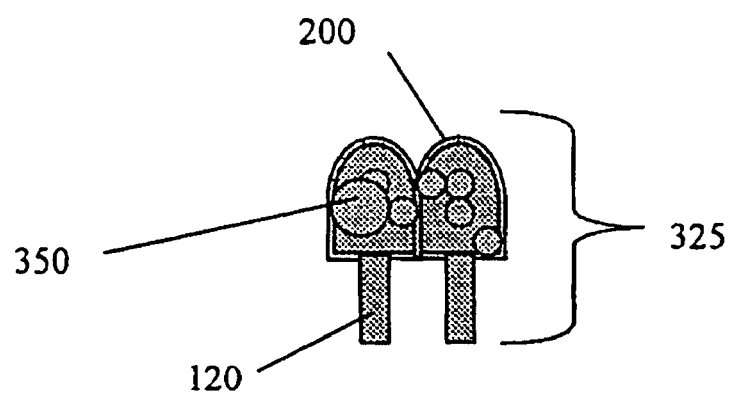
Figure 3E:
Figure 3E:
Figure 3E:

FIG. 3E illustrates a partially stamped manifold 325 having grease and scrap 350 located therein, according to an embodiment of the invention. As shown, the grease may collect on the inside and the outside of the partially stamped manifold 325. The scrap 350 may collect after the tubular body of the partially stamped manifold 325 is formed, and the cup holes 325 and created. As shown, the ends of the partially stamped manifold 325 are open (i.e., they have not yet been crimped), so the grease and the scrap 350 can be removed.

After implementation of the stages of the progressive press 302 and the first tandem press 330, the partially stamped manifold 325 may then be cleaned, as discussed above. Conventional degreasing equipment may be utilized to clean and degrease the partially stamped manifold 332. The partially stamped manifold 325 may be inserted in a degreasing machine to be cleaned. Scrap trapped within the partially stamped manifold 325 may also be removed. Since both ends of the partially stamped manifold 325 are open, cleaning solution may circulate more easily through the partially stamped manifold 325. Effective cleaning is important, since any residue of oil will affect the brazeability of the component in the latter brazing process.

With both ends of the partially stamped manifold 325 open, any scrap or work oil may easily be removed from the inside and the outside of the partially stamped manifold 325. With a multiple step stamping process, scraps may be removed from the partially stamped manifold 325 before it is completely stamped into a condenser manifold 100.

Figures 1, 3F:
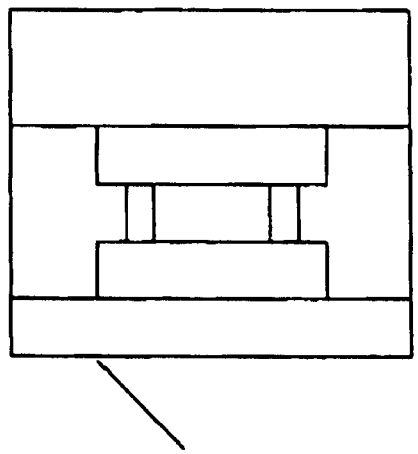
Figures 2, 3F:
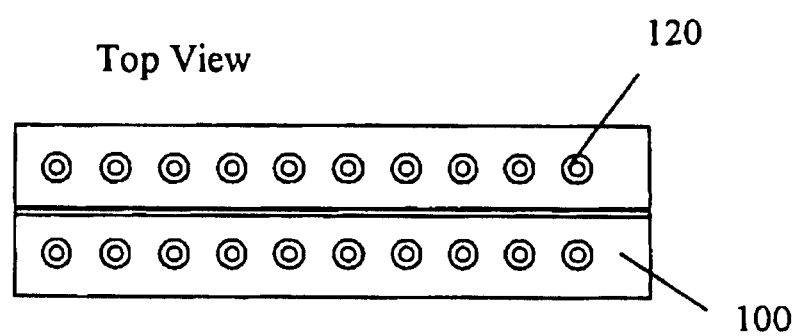
Figures 3, 3F:
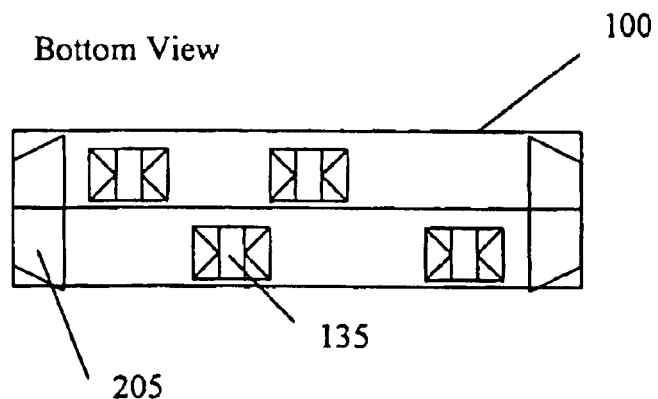
Figures 3, 3F, 4:
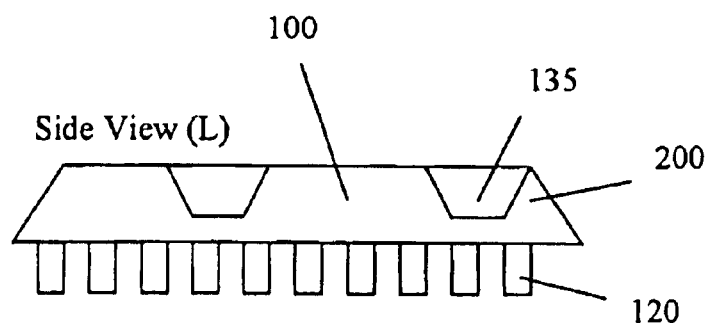
Figures 3, 3F, 4, 5:
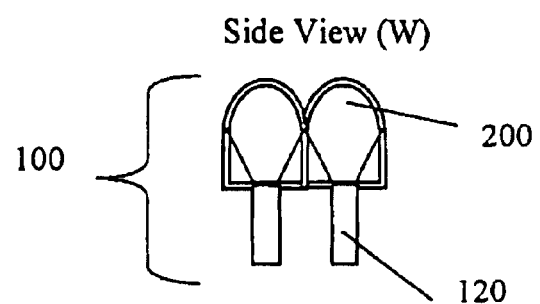

FIGS. 3F-1 to 3F-5 illustrate a second tandem press 340 used to form a condenser manifold 100 according to an embodiment of the invention. After completion of the cleaning process, the partially stamped manifold 325 may be inserted into the second tandem press 340 shown in FIG. 3F-1, which may be utilized to form the baffles 135 and the crimped ends 205 of the condenser manifold 100. The baffles 135 may be formed by pressing down sections of the tanks 200 of the partially stamped manifold 325. FIG. 3F-2 illustrates a top view of the completed condenser manifold 100. FIG. 3F-3 illustrates a bottom view of the completed condenser manifold 100 having baffles 135 formed thereon. The ends of the tanks 200 may be crimped, forming the crimped ends 205. FIG. 3F-4 illustrates a side view of the length side of the condenser manifold 100. FIG. 3F-5 illustrates a side view of the width side of the condenser manifold 100. After implementation of the second tandem press 340, the condenser manifold 100 may be completely formed. In other embodiments, separate tandem presses may be utilized to form the baffles 135 and the crimped ends 205. Additional embodiments may utilize a second progressive die to form the cup holes 332, the baffles 135, and the crimped ends 205.

Figure 4A:
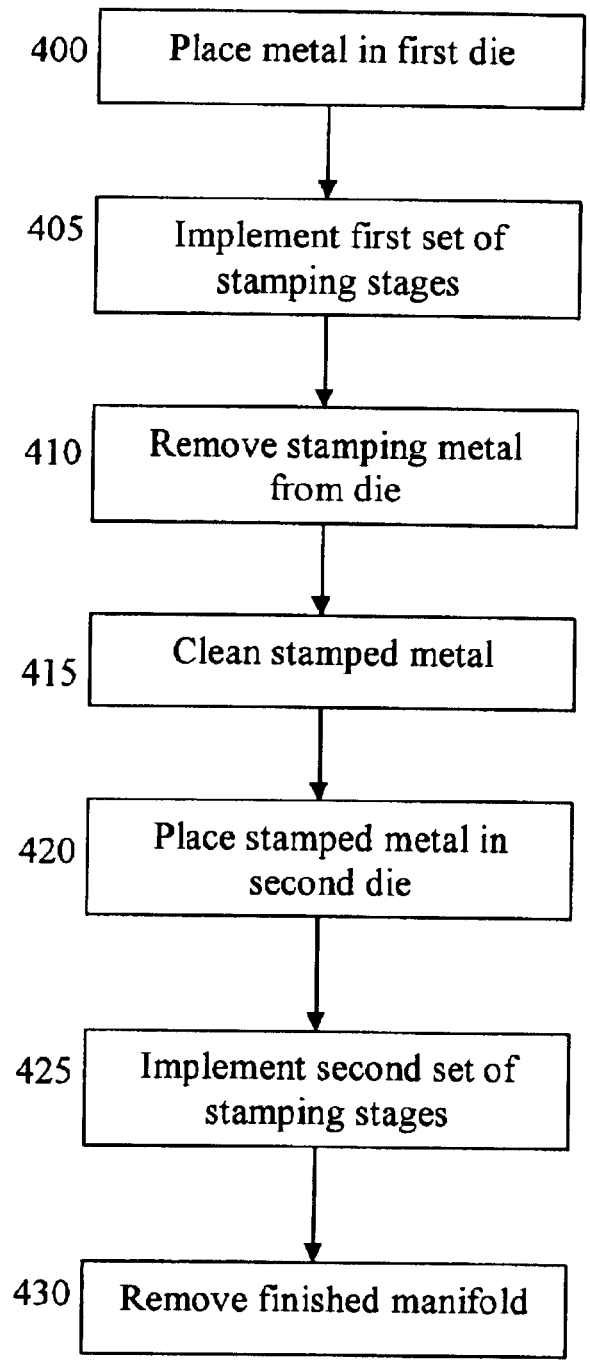
FIG. 4A illustrates a process utilizing two dies to form a finished condenser manifold according to an embodiment of the invention.

FIG. 4A illustrates a process utilizing two dies to form a finished condenser manifold 100 according to an embodiment of the invention. First, the sheet metal 300 used to form the manifold 100 is placed 400 in the first die. The sheet metal 300 may be formed of aluminum and coated with a clad material, for example. Next, the first set of stamping stages is implemented 405. The first set of stamping stages may be utilized to form the risers 120 and the tubular tanks 200, for example. Each of the stages may be utilized to progressively bend the sheet metal 300 until the risers 120 are formed. The stamping stages may be implemented at a temperature between room temperature and the melting point of the sheet metal 300. The first die may implement ten stages to form the risers 120, for example.

After the first set of stages has been implemented, the partially stamped manifold 325 may be removed 410 from the first die. Next, the partially stamped manifold 325 may be cleaned 415. Since metal scrap may fall into the risers 120 during the first set of stages or grease may fall onto the partially stamped manifold 325, it may beneficial to clean the stamped sheet metal. The partially stamped manifold 325 may be cleaned by blowing air through the risers 120 or over the rest of the stamped sheet metal, for example. In other embodiments, a solvent may be utilized to clean the stamped sheet metal. After cleaning, the stamped sheet metal may be placed 420 into the second die. The second set of stamping stages are then implemented 425. The baffles 135 may be formed during the second set of stamping stages. Alternatively, the crimped ends 205 may also be formed via the second die. In an embodiment, the second die may implement multiple stages, for example. Finally, after the second set of stages has been implemented, the finished manifold 100 may be removed from the second die.

Although the process described above describes use of only two dies, other embodiments may utilize more than two dies if necessary. For example, a set of tandem presses may be utilized, where each tandem press implements a single stamping stage. Also, other embodiments may form the cylindrical tanks 200 before the risers 120. In general, all of the stamping stages involve the application of large amounts of pressure to the sheet metal to progressively shape it into a manifold 100.

Because multiple dies are utilized, a user may produce manifolds 100 of different lengths more quickly than could be done if a single die were used. For example, the user may utilize the first die and stockpile the stamped sheet metal. Then, when the user wishes to form the finished manifolds 100 of different lengths, the user may use the second die to form manifolds 100 of the first length. Then, the user may adjust the settings on the second die so that manifolds 100 of a different length or different circuitry of baffles may be formed. Since parts with the same length can have different cup hole location/angle, as well as different baffle circuitry, the user of this process has more flexibility when scheduling production. Such a method is faster than if a single die were used because a single die, designed to handle all forming operations, can be very complex with multiple die stages that need to be changed per each specific manifold model. Also, time spent changing over may lead to down-time in production.

Figure 4B:
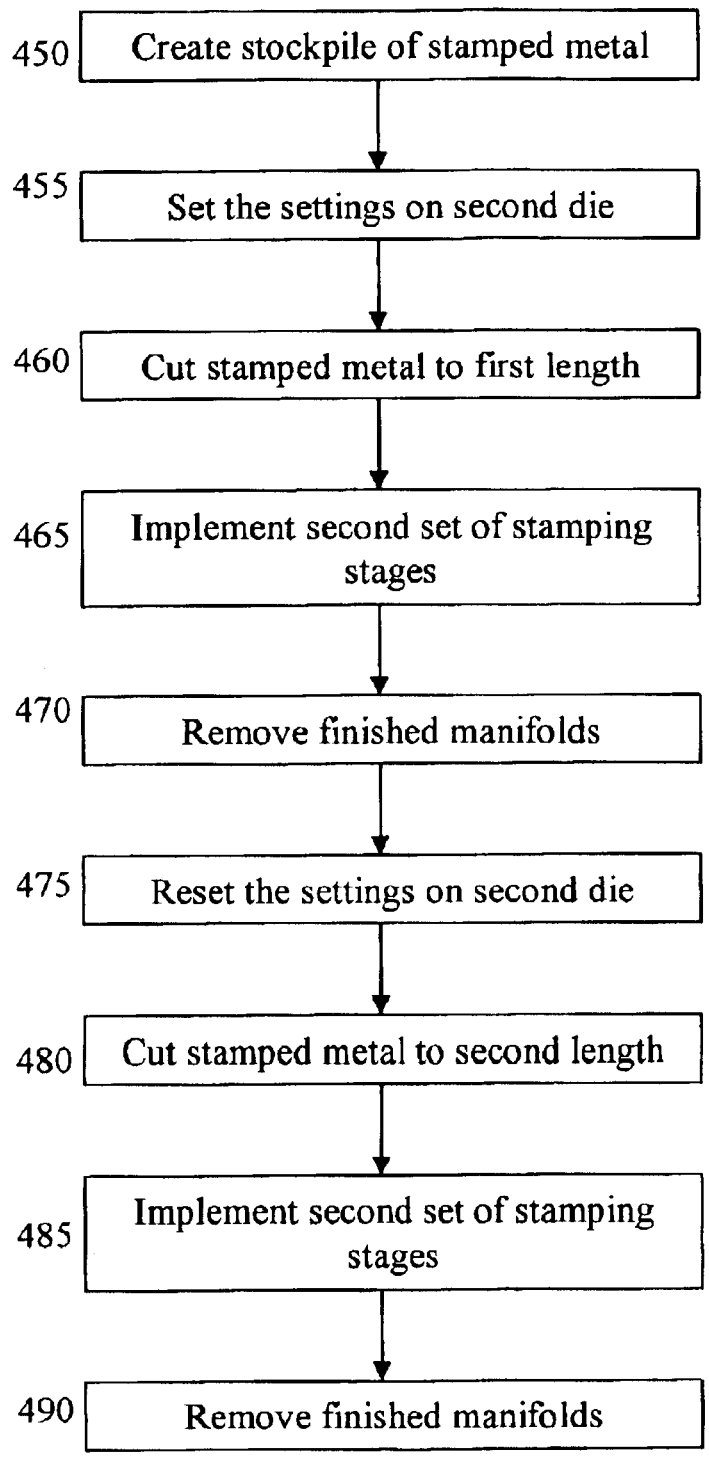
FIG. 4B illustrates a process to create manifolds of different lengths according to an embodiment of the invention.
Figure 5:
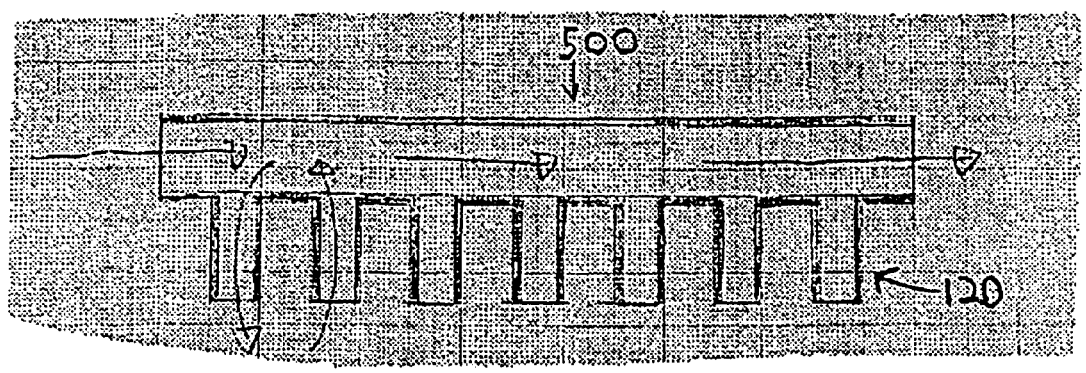

FIG. 4B illustrates a process to create manifolds of different lengths according to an embodiment of the invention. First, a user of the dies may create 450 a stockpile of stamped blank manifolds 100. The user may create the stockpile though the use of the first die. The user may set the first die to produce manifolds of a length suitable for the longest manifold 100 the user may need to produce. For example, if the user is a supplier of manifolds 100 of two sizes: one short and one long, the user may generate a stockpile of the stamped sheet metal suitable to form manifolds 100 for the longest application. The user may then cut off the excess length of the stamped sheet metal when necessary to form the manifolds 100 of the shorter length.

The user may then set 455 the settings on the second die. For example, the second die may be set to produce manifolds of the longer length. Next, the user may cut 460 the stamped sheet metal to the first length if necessary. The second set of stages may then be implemented 465 on the stamped sheet metal. After the second set of stages have been implemented, the user may remove 470 the finished manifolds 100 from the second die.

The settings on the second die may then be reset 475 to produce manifolds of the second length. The user may then cut 480 stamped sheet metal from the stockpile to an appropriate length if necessary. The second set of stamping stages is then implemented 485 on the stamped sheet metal. Finally, the user may remove 490 the finished manifolds from the second die. In other embodiments more than two lengths of manifolds may be utilized. Accordingly, the second die may have to be set more than twice and the stamped sheet metal may be cut into manifolds of more than two lengths.

FIG. 5 illustrates a cut-away view of the stamped sheet metal after implementation of the first set of stamping stages according to an embodiment of the invention. As shown, the risers 120 have been formed in the metal. The user may then clean out the stamped sheet metal by blowing air over the stamped sheet metal and through the risers 120 as shown by the arrows.

Figure 6:
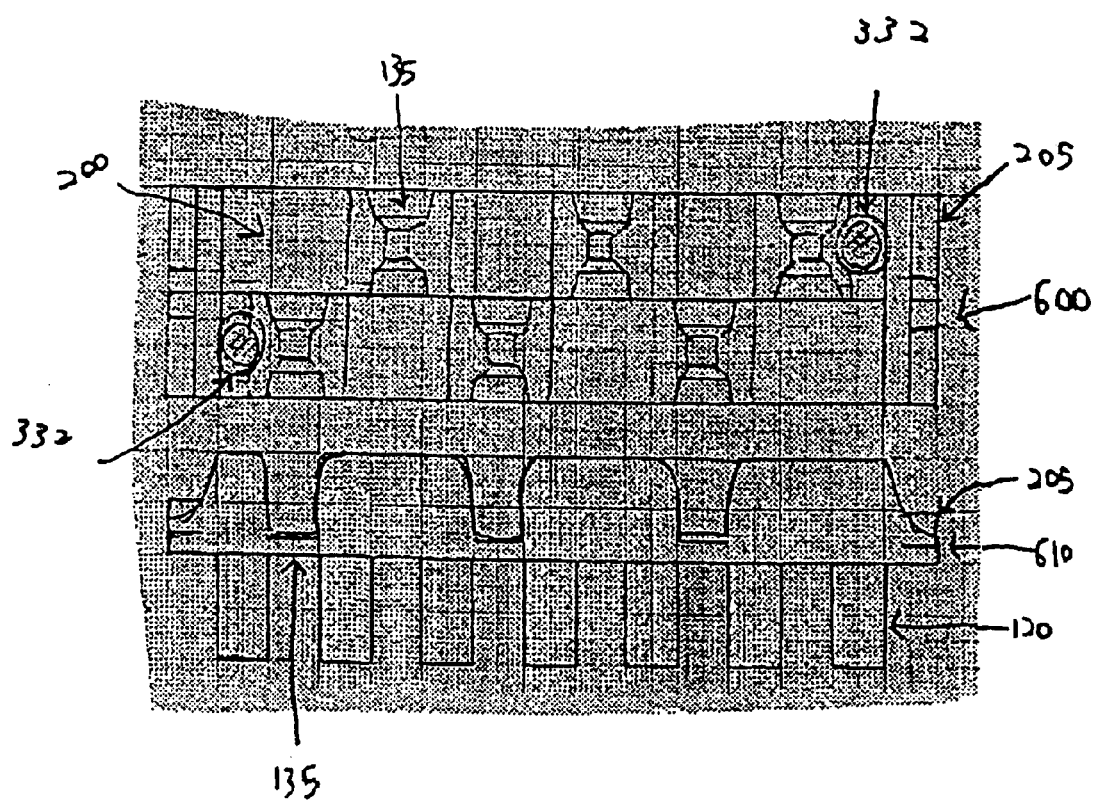
FIG. 6 illustrates top and side views of a finished manifold according to an embodiment of the invention.

FIG. 6 illustrates top and side views of a finished condenser manifold 100 according to an embodiment of the invention. As shown, the manifold includes multiple baffles 135. The baffles 135 are formed close together. Accordingly, when the condenser manifold 100 is coupled to a condenser, the numerous baffles 135 will serve to ensure that most of the refrigerant will flow through the pipes 115 of the condenser 105. The condenser manifold 100 also includes cup holes 332 to accept refrigerant into the condenser manifold 100, and to expel refrigerant from the condenser manifold 100. In other embodiments, the locations of the inlet aperture 210 and the outlet aperture 605 may differ.

As shown in the side view, the baffles 135 may be located between the risers 120. Such a location may ensure that most of the refrigerant is forced through the risers 120 and into the pipes 115 of the condenser.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system to construct a manifold from a single piece of an original material, comprising:

a first progressive die to implement a first set of stamping stages on the single piece of original material to generate a shaped material, wherein the first progressive die is utilized to form a plurality of risers and a plurality of tanks in the shaped material; and a second die to implement at least one of a second set of stamping stages on the shaped material to generate a finished manifold, wherein the second die is physically separate from the first die, and the second die is utilized to crimp the ends of the plurality of tanks to seal the tanks.

2. The system according to claim 1, wherein the original material is an aluminum alloy.

3. The system according to claim 2, wherein the aluminum alloy is coated with a clad material.

4. The system according to claim 1, wherein the second die is utilized to form the baffles in the tanks.

5. The system according to claim 1, further including a cleaning device to clean the shaped material.

6. The system according to claim 1, wherein the second die is a second progressive die.

7. The system according to claim 1, wherein the second die is a tandem press.

8. A method to form a manifold from a single piece of an original material, comprising:

utilizing a first progressive die to implement a first set of stamping stages on the single piece of original material to generate a shaped material, wherein the first progressive die is utilized to form a plurality of risers and a plurality of tanks in the shaped material;

removing the shaped material from the first progressive die;

placing the shaped material in a second die; and utilizing a second die to implement at least one of a second set of stamping stages on the shaped material to generate a finished manifold, wherein the second die is physically separate from the first progressive die, and the second die is utilized to crimp the ends of the plurality of tanks to seal the tanks.

9. The method according to claim 8, wherein the original material is an aluminum alloy.

10. The method according to claim 9, wherein the aluminum alloy is coated with a clad material.

11. The method according to claim 8, wherein the at least one of the second set of stamping stages is ultilized to form the baffles in the tanks.

12. The system according to claim 8, further including cleaning the shaped material.

13. The method according to claim 8, wherein the second die is a second progressive die.

14. The method according to claim 8, wherein the second die is a tandem press.

* * * * *